United States Patent [19]

Viskochil et al.

[11] Patent Number: 4,594,627
[45] Date of Patent: Jun. 10, 1986

[54] SAFETY LATCH FOR PICKUP HEADS AND CARRIAGE DISC DRIVE

[75] Inventors: Stephen R. Viskochil, San Jose; Brian H. Simons, Oakland, both of Calif.

[73] Assignee: Priam Corporation, San Jose, Calif.

[21] Appl. No.: 508,806

[22] Filed: Jun. 28, 1983

[51] Int. Cl.$^4$ .................... G11B 5/54; G11B 21/22; G11B 5/48; H02K 00/00; G11B 5/48
[52] U.S. Cl. .................... 360/105; 360/104; 360/106; 360/107; 310/10; 310/12
[58] Field of Search ................ 360/105, 106, 107, 86, 360/97, 98, 99, 137; 310/10, 12

[56] References Cited

U.S. PATENT DOCUMENTS

| | | | |
|---|---|---|---|
| 3,626,113 | 12/1971 | Jones et al. | 360/107 |
| 3,668,443 | 6/1972 | Schwartz | 310/12 |
| 3,743,794 | 3/1972 | Miller, III | 360/105 |
| 3,852,816 | 12/1974 | Stewart | 360/105 |
| 3,981,245 | 9/1976 | Buzzell et al. | 310/12 |
| 4,058,844 | 11/1977 | Dirks | 360/106 |
| 4,110,802 | 8/1978 | Ho et al. | 360/106 |
| 4,218,714 | 8/1980 | Isozaki et al. | 360/105 |
| 4,305,105 | 12/1981 | Ho et al. | 360/106 |
| 4,439,699 | 3/1984 | Brende et al. | 310/13 |
| 4,484,241 | 11/1984 | Brende et al. | 360/105 |

FOREIGN PATENT DOCUMENTS 2019659 10/1979 United Kingdom .................. 310/12

OTHER PUBLICATIONS

IBM Technical Disclosure Bulletin, vol. 26, No. 3B, Aug. 1983, Brende et al., "Magnetic Home Latch Assembly", pp. 1693-1694.
IBM Technical Disclosure Bulletin, vol. 15, No. 3, Aug. 1972, Chai et al., "Linear Actuator", p. 917.
IBM Technical Disclosure Bulletin, vol. 21, No. 1, Jun. 1978, Borg et al., "Bidirectional Crash Stop Removable with Head-Disk Assembly", p. 312.

*Primary Examiner*—A. J. Heinz
*Assistant Examiner*—Alfonso Garcia
*Attorney, Agent, or Firm*—Flehr, Hohbach, Test, Albritton & Herbert

[57] ABSTRACT

A safety latch is provided for a disc drive to prevent accidental movement of the pickup heads across the recording surface of a disc when power to the disc drive is terminated. The safety latch includes a magnet which engages a mechanical stop for limiting the inward travel of the pickup head assembly. In a preferred embodiment the magnet is mounted on the bobbin of a linear motor which moves the pickup head assembly.

3 Claims, 3 Drawing Figures

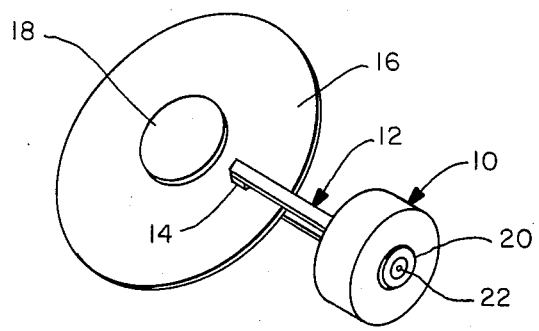
FIG.—1
PRIOR ART
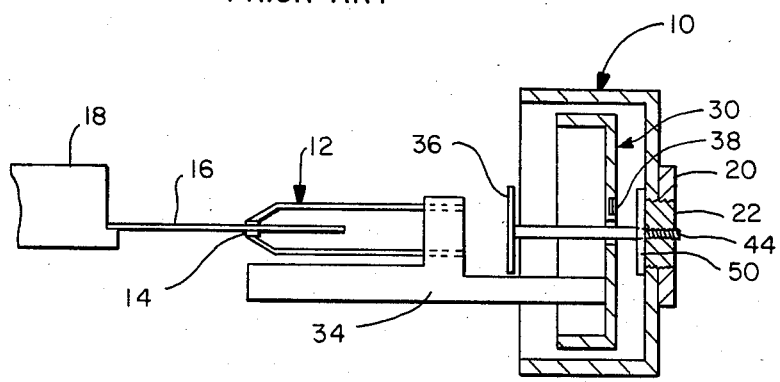
FIG.—2
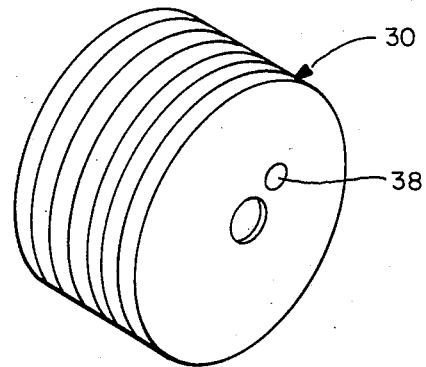
FIG.—3

SAFETY LATCH FOR PICKUP HEADS AND CARRIAGE DISC DRIVE

This invention relates generally to magnetic disc drives, and more particularly the invention relates to a safety latch for the pickup head carriage in a disc drive.

Discs having magnetic coatings on the surfaces thereof provide memories for bits of data which can be randomly accessed at high speed for either retrieving or storing data. Typically, heads having a small coil are moved across the disc surfaces while the disc is spinning for detecting or storing data in concentric data tracks on the disc surfaces. The heads ride on a thin layer of air created by the spinning disc with the heads in close proximity to but spaced from the disc surface.

To alleviate problems of contamination and alignment of read/write heads, sealed disc drives have been introduced. These units include read/write heads and carriage, linear actuator for the carriage, drive motor and spindle, and magnetic discs which are sealed in a housing. Air from outside the sealed housing passes through a breather filter in the housing, and air flow within the sealed housing created by the spindle and disc rotation is also filtered.

The pickup head and carrier assembly is driven by a linear actuator including a voice coil assembly. Conventionally, a crash stop mechanism is provided in the linear actuator to limit the travel of the magnetic head assembly and prevent crashes of the pickup head with the spindle at the inner radius of the disc and to prevent the heads from falling off the outer edge of the magnetic disc. A shock absorption mechanism must be provided within the linear actuator to absorb the shock of fast moving head carriage as it engages the limit stops. Additionally, the limit stop assembly must provide accurate positioning of the pickup heads above inner and outer guard bands on the magnetic disc to generate requisite control signals for the servo system control of the heads.

During power down of the disc drive the linear motor control is programmed to move the pickup head carriage to a maximum inward position so that the pickup heads will land on a protected inner surface of the disc and thus prevent damage to the data storage portion of the disc surface as the disc slows to a stop. Thereafter, a manually actuated brake can be engaged with the carriage to hold the heads on the landing surface. However, if the brake is not engaged and the disc drive is physically tilted, the carriage can move outwardly with possible damage to the recording surfaces by the heads.

Accordingly, an object of the present invention is a safety latch for retaining pickup heads on the landing surface of a disc when a disc drive is powered down.

A feature of the invention is magnetic means cooperatively arranged with the carriage assembly for engaging the inner crash stop limit and thereby retaining the pickup head on the landing surface of the disc.

The invention and objects and features thereof will be more readily apparent from the following detailed description and appended claims when taken with the drawing, in which:

FIG. 1 is a perspective view illustrating a linear actuator and pickup head carriage assembly with a magnetic disc.

FIG. 2 is a side view partially in section of one embodiment of a linear actuator and carriage assembly in accordance with the present invention.

FIG. 3 is a perspective view of the bobbin of the linear actuator and carriage assembly in accordance with one embodiment of the invention.

Referring now to the drawings, FIG. 1 is a perspective view illustrating a linear actuator 10 and carriage 12 for moving magnetic heads 14 across the surface of a magnetic disc 16 for retrieving and storing data thereon. The disc 16 is mounted on a spindle 18 and is rotated by a drive motor as the pickup head 14 reads and records data. The disc, spindle, drive motor, and linear actuator are assembled in one unit with the disc sealed to prevent contamination of the magnetic heads and disc surfaces.

The linear actuator is normally provided with limit stops for preventing the heads from crashing into the spindle 18 or from falling off from the edge of the disc 16. Moreover, the limit stops must be accurately positioned so that the heads 14 are positioned over guard bands on the disc surfaces at the inner and outer limits of travel of the heads so that control data in the guard bands is received by the servo drive which controls the linear actuator. Stored data on the surface of the disc lies between the two guard bands.

FIG. 2 is a side view partially in section of one embodiment of a linear actuator and carriage stop assembly in accordance with the invention. A voice coil and bobbin assembly shown generally at 30 within the housing of linear 10 drives the carriage assembly 34 and heads 14 inwardly until the bobbin 30 engages the inner limit stop 36. During power down of the disc drive the control of the pickup head carriage assembly is programmed to move the pickup heads to a landing area at the innermost portion of the disc surface.

FIG. 3 is a perspective view of the bobbin 30 showing the placement of a rare earth magnet 38 in a recess in the end wall of the bobbin. A suitable epoxy is applied to seal the magnet within the bobbin wall. The limit stop 36 includes a ferrous material, and rare earth magnet 38 mounted in the end wall of bobbin 30 magnetically attaches the bobbin to the limit stop 36 thereby yieldably maintaining the bobbin in contact with the limit stop 36. Once the magnetic disc is again powered into operation, the linear motor has sufficient power to overcome the magnetic attraction of the magnet 38 and the limit stop 36. However, the magnetic attraction is sufficient to maintain the bobbin and carriage assembly in abutment with the limit stop upon tilting of the disc drive, for example.

The safety latch for the pickup head carriage is readily incorporated in a disc drive assembly. Importantly, the safety latch does not require the intervention of the human operator and is automatically engaged upon power down of the disc drive when the carriage assembly is moved inwardly for placement of the head on the landing surface.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:
1. A disc drive comprising
   a housing,
   a magnetic disc rotatably mounted in said housing, a linear motor including a bobbin within said housing, a pickup head carriage assembly driven by said bobbin between an inward and an outward limit, a limit stop assembly for limiting travel of said bobbin and pickup head carriage assembly, and a magnet mounted on said bobbin for magnetically engaging said limit stop assembly at the inward limit of travel of said bobbin and pickup head carriage assembly and yieldably maintaining said bobbin and pickup head carriage assembly at the inward limit of travel.

2. In a disc drive in which a pickup head assembly is moved between an inward and an outward limit relative to the surface of a magnetic recording disc and in which travel of the pickup head assembly is limited by a mechanical stop, a safety latch for yieldably maintaining the pickup assembly at the inward limit of travel comprising a magnet mounted in the pickup head assembly and magnetically engaging said mechanical stop when said pickup assembly is at the inward limit of travel.

3. The safety latch as defined by claim 1 wherein said pickup head assembly includes a bobbin of a linear motor and said magnet is mounted on said bobbin.

* * * * *